United States Patent [19]

Stubbersfield et al.

[11] 4,446,623
[45] May 8, 1984

[54] NOTCHING TOOL

[75] Inventors: Edgar M. Stubbersfield; Leslie V. Shaw, both of Gatton, Australia

[73] Assignee: Beryl Grace Stubbersfield, Australia

[21] Appl. No.: 300,486

[22] Filed: Sep. 9, 1981

[30] Foreign Application Priority Data

Sep. 12, 1980 [AU] Australia .................. PE5546

[51] Int. Cl.³ .................................. B26B 13/06
[52] U.S. Cl. ........................... 30/229; 30/233; 83/191; 83/693; 83/917
[58] Field of Search .............. 83/54, 178, 191, 195, 83/597, 605, 606, 693, 692, 917; 30/229, 230, 178, 363, 364, 368, 233

[56] References Cited

U.S. PATENT DOCUMENTS

| | | | |
|---|---|---|---|
| 1,985,862 | 12/1934 | Kronquest | 30/233 |
| 2,556,819 | 6/1951 | Musselwhite et al. | 30/229 |
| 2,751,681 | 6/1956 | Hillson | 30/229 |
| 3,126,781 | 3/1964 | Hall | 83/698 X |
| 3,215,017 | 11/1965 | Rutz | 83/693 |
| 3,355,975 | 12/1967 | Anfuso | 83/917 |
| 3,393,595 | 7/1968 | Halverson et al. | 30/233 X |
| 3,616,719 | 11/1971 | Tassie | 83/917 X |

Primary Examiner—William R. Briggs
Assistant Examiner—Lawrence Meier
Attorney, Agent, or Firm—Oldham, Oldham, Hudak, Weber & Sand Co.

[57] ABSTRACT

A notching tool for forming notches in ridge- or hip-capping for roofs, the notches being formed to match the profile of the roofing sheets.

The tool has a base with a pair of spaced feet which engage the ribs on the roofing sheets to align the tool. A notching head on the base has a replaceable die and punch pair, one of which is fixed to support the capping while the other is manually or power-operated to provide a shearing-type cutting action between the die and punch to cut the notches. Adjustable guides on the notching head support the capping for angular alignment between the capping and the notching head and for adjustment of the depth of the notch. The notching head may be pivotally and/or rotatably mounted on the base and the die and punch may be reversible.

6 Claims, 5 Drawing Figures

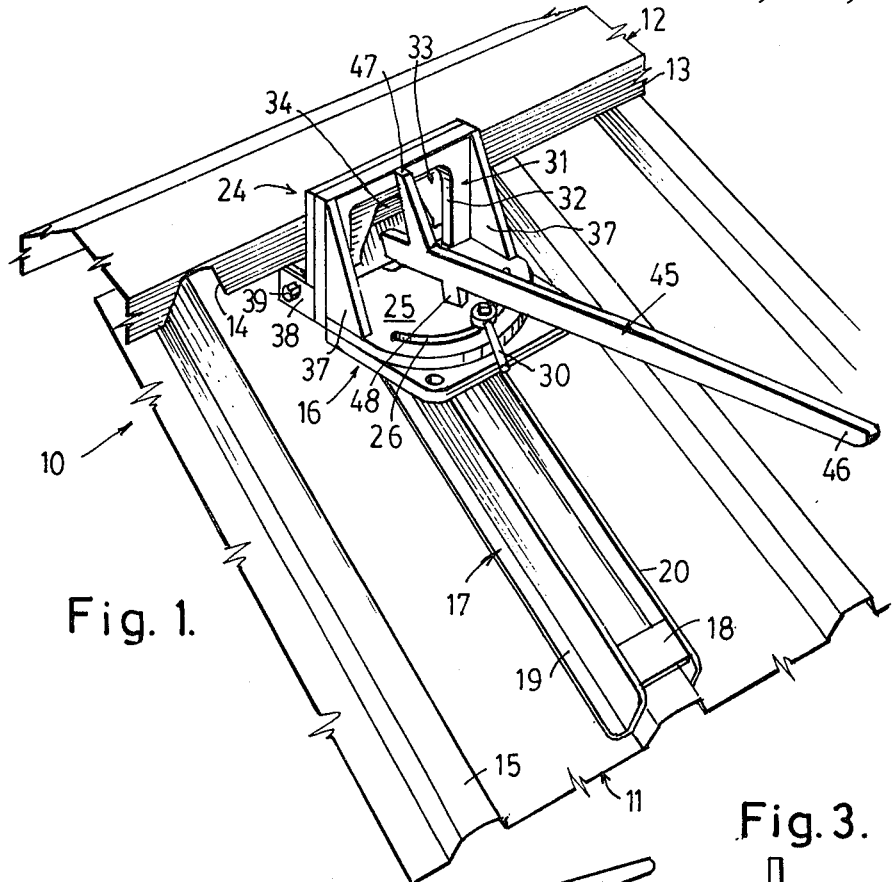
Fig. 1.
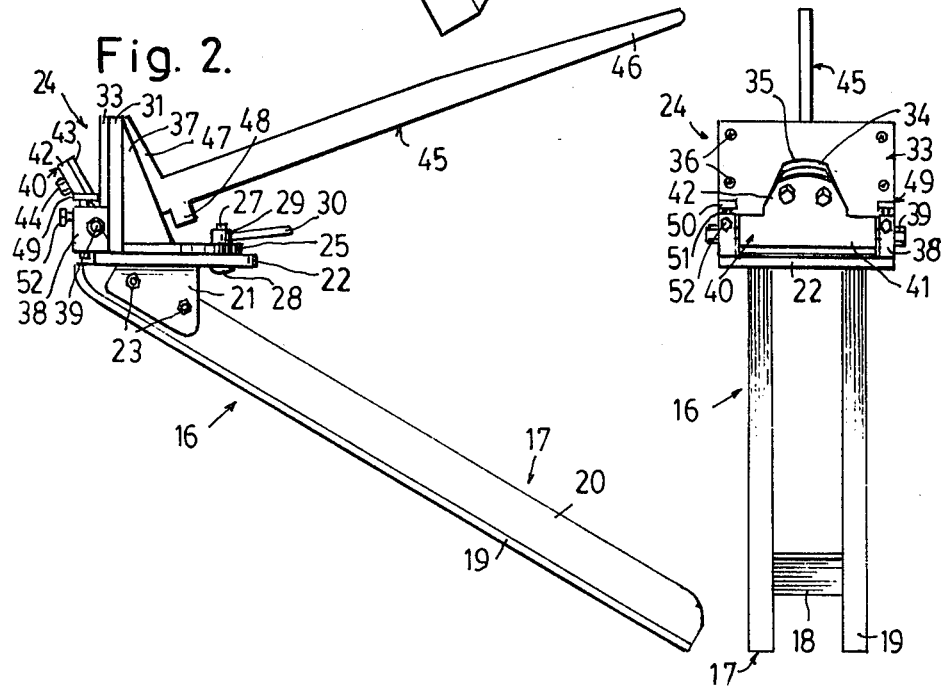
Fig. 2.
Fig. 3.

NOTCHING TOOL

BACKGROUND OF THE INVENTION

1. Field of the Invention

This invention relates to a notching tool for forming notches in sheet-like material. The tool is particularly suitable for, but not limited to, forming notches in ridge- or hip-capping during roof construction.

2. Description of the Prior Art

A major problem which arises when fitting ridge- or hip-capping to a roof structure is the need to cut notches in the ridge- or hip-capping to match the profile of the rolled section iron or aluminium roofing sheets. Previously, these notches have been marked or scribed on the capping in situ (or elsewhere) and then laboriously cut by hand using a pair of shaped snips or shears while the capping is loosely held in position. Not only is this method extremely labor intensive, but a poor match is usually achieved between the notches cut in the capping and the respective ribs on the roof sheeting.

BRIEF SUMMARY OF THE INVENTION

It is an object of the present invention to provide a notching tool which is particularly (but not exclusively) suitable for cutting notches in ridge- or hip-capping or like preformed sheet sections.

It is a preferred object to provide a tool where provision is made to enable the tool to cut a variety of notch profiles.

It is a further preferred object to provide alignment means on the tool to locate the tool to permit the situ operation and to ensure that the notches are aligned with the ribs on roof sheeting when used to notch ridge- or hip-capping.

It is a still further preferred object to provide a notching tool which is simple and inexpensive to manufacture, and which is simple and quick to use.

Other preferred objects of the present invention will become apparent from the following description.

In the broad aspect, the present invention resides in a notching tool for notching sheet-like materials including:

a base member;

a notching head on the base member comprising a die member and a punch member adapted to co-operate with the die member; and means to operate the notching head.

Preferably the base includes a pair of spaced, substantially parallel, support members. Preferably the support members are spaced a suitable distance apart to accommodate a rib or protrusion on a first member—the notches to be formed in the sheet enabling co-operation between the rib or protrusion on the first member and the sheet. In certain applications, at least one outrigger-type support member may be provided on the base member to prevent the tool from tipping during use.

Preferably the die member and the punch member are removably mounted in the notching head to enable them to be changed or replaced. Preferably a number of presets of die and punch members are provided for the tool, each die and punch member pair being suitably profiled to correspond to the profile of a particular rib or protrusion on, for example, ribbed roofing sheets enabling the tool to be used for a wide range of notch profiles. The die and punch members may be reversible (i.e. they may have cutting edges on both sides) so they may be used e.g. to cut the notches along each side of a hip-capping to co-operate with the profile of the ribs of a particular ribbed roofing sheet.

Preferably one of the die and punch member pair is fixed and the other is pivotally mounted on the notching head, to co-operate with the fixed member to provide a shearing-type cutting action between the die and punch members, to form the notches in the sheet.

The notching head may be pivotally and/or rotatably mounted on the base member to enable the fixed die or punch member to engage and support the portion of the sheet to be notched as the notch is formed.

Preferably, adjustable guide means are provided on the notching head to permit angular alignment between the edge of the sheet to be notched and the aperture in the die member, or to enable adjustment of the depth of the notch cut by the tool.

The operating means may include a manually-operated lever or a hydraulic- or pneumatic cylinder connected to the movable die or punch member.

BRIEF DESCRIPTION OF THE DRAWINGS

To enable the invention to be fully understood, a number of preferred embodiments will now be described with reference to the accompanying drawings, in which:

FIG. 1 is a top perspective view of a hand-operated tool of a first embodiment forming a notch in the ridge-capping of a roof structure;

FIGS. 2 and 3 are side and front views, respectively, of the tool of FIG. 1;

DETAILED DESCRIPTION OF PREFERRED EMBODIMENT OF THE INVENTION

Figure 4:
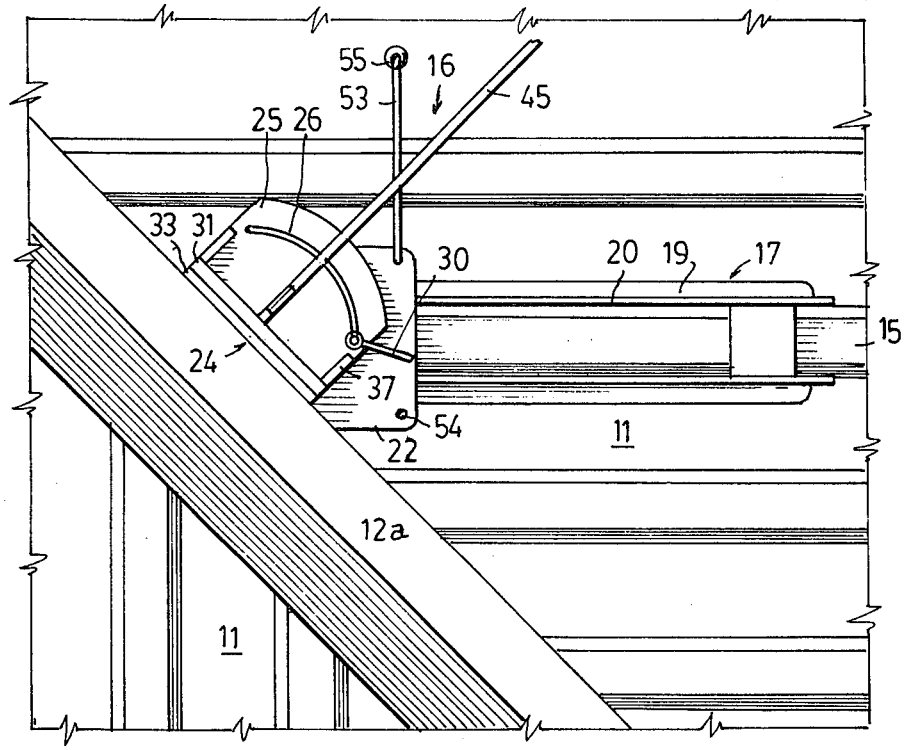
FIG. 4 is a plan view showing the tool of FIG. 1 forming a notch in the hip-capping of a roof structure.

Referring to FIG. 1, a roof structure 10 has a series of rolled section aluminium roof sheets 11 laid side-by-side (in overlapping relationship) along each side of a ridge, the ridge to be covered by a ridge-capping 12, of preformed aluminium sheeting, having substantially vertical sides 13. To enable the ridge capping to sealably cover the ridge, notches 14 are formed at spaced intervals along the sides 13 to engage, and co-operate with, the spaced ribs 15 of the roofing sheets. The notching tool 16, of FIGS. 1 to 4, has a pair of spaced, substantially parallel, feet 17 connected by a cross-bar 18. Each foot 17 has a substantially horizontal web 19 and a substantially vertical flange 20. The distance between the feet 17 is substantially equal to the width of the roofing sheet ribs 15 at their bases.

A pair of support flanges 21 are provided on the underside of a base plate 22 and are secured to the flanges 20 on the feet 17 by suitable fasteners 23. As shown in FIG. 2, the base plate 22 is angularly inclined to the feet 17 so that it is substantially horizontal when the tool is supported on the roofing sheets 11. (If preferred the base plate 22 may be mounted for angular pivotal movement relative to the feet 17 to accommodate different angles of roof pitch).

The notching head 24 has a foot plate 25 pivotally mounted on the base plate 22 about a vertical axis. A curved slot 26 is formed in the foot plate to receive the shanks 27 of a bolt 28 fixed in the base plate 22. A nut 29, having a handle 30, is screw-threadably mounted on the shank 27 and may be selectively loosened or tightened to enable the foot plate 25 to be rotated and locked relative to the base plate 22, to enable the notching head 24 to be rotated relative to the feet 17.

A rectangular substantially vertical die support frame 31 is mounted on the foot plate 25 and has an aperture 32 therethrough. A die plate 33, having a profiled notching aperture 34 surrounded by a hardened cutting edge 35 is releasably mounted on the support frame 31 by suitable fasteners 36.

As shown in FIG. 3, the notching aperture 34 has a profile corresponding to the profile of the roofing sheet ribs 15. A pair of gussets 37 are provided to support and strengthen the die support frame 31. The axis of rotation of the foot plate 25 is centred on the die plate 33.

A pair of flanges 38 extend forwardly of the die support frame 31 and are interconnected by a substantially horizontal transverse bolt 39.

A punch 40 has a tubular body 41 rotatably mounted on the bolt 39 between the flanges. A backing plate 42 is fixed to the body 41 and supports a removable punch plate 43 secured by suitable fasteners 44. The punch plate 43 has a profile corresponding to the notching aperture 34 of the die plate 33 and has cutting edges around its sides to generate a shearing-type cutting action between the die and punch plate 33, 43.

An elongated handle 45 is fixed to the back of the punch 40 and extends rearwardly through the apertures 32, 34 to a grip 46 at its free end. An upstanding leg 47 on the handle engages the rear face of the die support frame 31 to limit the upward stroke of the handle, while a toe 48 on the underside of the handle engages the foot plate 25 to limit the downward stroke.

A pair of support guides 49 are provided forwardly of the die plate 33 and have guide plates 50 supported on shanks 51 slidably mounted in the flanges 38. Set-screws 52 in the flanges 38 enable the guides 49 to be adjusted and set relative to the die plate 33.

The operation of the tool 16 to cut notches 14 in the ridge-capping 12 will now be described.

The ridge-capping 12 is laid along the ridge and loosely held in position.

The appropriate die and punch plates 33, 43 are fitted to the tool to correspond to the profile of the ribs 15 and the foot plate 25, and adjusted and set relative to the base plate 22 so that the die plate 33 is at a normal to the longitudinal axis of the feet 17. The support guides 49 are adjusted and set relative to the flanges 38 to select the required height of the notches 12 to be cut.

The tool 16 is placed on one of the roofing sheets 11 with one of the ribs 15 engaged between the vertical flanges 20 of the feet 17.

The handle 45 is raised until the upstanding leg 47 engages the die support frame 31, tipping the punch 40 forwardly (as shown in FIG. 2).

The ridge-capping is raised and the tool is moved along the rib until the die plate 33 engages the outer face of the side 13 of the capping (the punch 40 now lies inside the capping). The capping is lowered until the bottom edge of the capping is supported by the support guides 49.

The operator pushes the handle 45 downwardly to move the punch 40 towards the die plate 33. As the punch plate 43 progressively enters the die plate 33, commencing at each side of the punch plate at the bottom edge of the capping, a shear-type cutting action is produced between the cutting edges of the plates. When the handle 45 is pushed to the lower limit of its stroke (i.e. the toe 48 engages the foot plate 25), the punch plate 43 fully enters the notching aperture 34 in the die plate 33 and the notch 14 is formed in the capping 12.

The handle 45 and the capping 12 are both raised and the tool 16 is removed.

The tool is then engaged on the next rib along the roofing sheet 11 and the operation is repeated until the notches 14 have been formed along both sides of the capping 12.

The capping 12 is then laid in position, each notch 14 co-operating with a respective rib 15 on a roofing sheet, and the capping is fixed in position by known fastening methods.

FIG. 4 shows a plan view of the tool 16 forming a notch in a hip-capping 12a.

The notches in the hip-capping 12a have a different profile to the notches 14 in the ridge-capping 12 due to the angular relationship between the capping 12a and the roofing sheets 11—the lower vertical side of the notch is longer than the upper side and the top of the notch is inclined to the horizontal. Therefore, the die and punch plates 33, 43 are replaced by another pair of die and punch plates which have the appropriate profile for the notches in the hip-capping.

Before the notches are cut, the notching head 24 is rotated relative to the base plate 22 so that the front face of the die plate will engage the side of the hip-capping. The angle of rotation between the foot plate 25 and the base plate 22 may be read off a scale (not shown) around the slot 26. The support guide 49 which will support the higher end of the hip-capping is raised relative to the second guide 49.

To prevent the tool 16 from tipping over during the notching operation, an outrigger arm 53 is provided. At its inner end, the outrigger arm has a downwardly directed pin (not shown) which engages in a hole 54 in the base plate. At the outer end, a rubber foot 55 is fitted to the outrigger arm to engage the supporting roofing sheet 11.

The operation for producing the notches along one side of the hip-capping 12a is as hereinbefore described with respect to the ridge-capping 12.

To produce the notches along the other side of the hip-capping, the die and punch plates are reversed, the notching head 24 is swung in the other direction relative to the base plate 22, and the outrigger arm 53 is fitted to the other side of the base plate 22.

The operation of forming notches is then repeated, as hereinbefore described.

Figure 5:
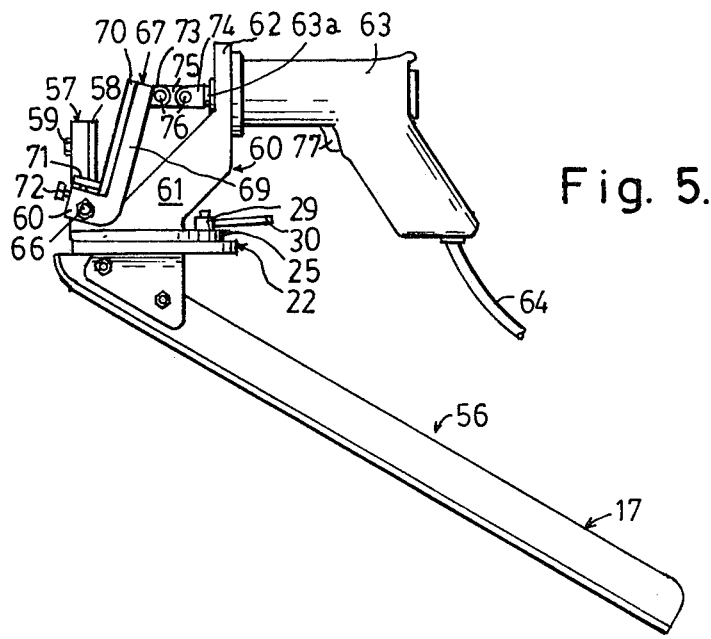
FIG. 5 is a side view of a power-operated tool of a second embodiment of the present invention.

FIG. 5 shows a power-operated tool 56 which has a base and foot plate assembly identical with the base and foot plate assembly of the tool 16 of FIGS. 1 to 4.

The punch 57 is fixed to the foot plate 25 and is fitted with a removably mounted punch plate 58 secured by fasteners 59. A support frame 60 is fixed on the foot plate 25 and has a pair of side flanges 61 interconnected by a transverse plate 62 having an aperture therethrough (not shown). The cylinder of a double-acting pneumatic ram 63, connected to a source of pressurized air by an airhose 64, is mounted on the transverse plate 62. A pair of extension flanges 65 extend forwardly of the side flanges 61 and they are interconnected by a transverse bolt 66, whch also passes through the punch 57.

A die support frame 67, of substantially inverted U-shape, has forwardly directed flanges 68 at the lower end of each leg 69 pivotally mounted on the bolt 66. A die plate 70, having a notching aperture corresponding to the profile of the punch plate 58, is releasably mounted on the front face of the die support frame 67 by fasteners (not shown).

Support guides 71 are adjustably mounted on the flanges 68 and are locked in position by set-screws 72. A bifurcated knuckle 73 on the rear of the die support frame 67 is connected to a similar knuckle 74 on the free end of the piston rod 63a of the pneumatic ram 63 via a link 75 fitted with pivot pins 76.

In operation, the feet 17 lie along each side of the ribs 15 and the rearward face of the punch plate 58 engages the side 13 of the ridge-capping 12 (or hip-capping 12a), the lower edge of the capping being supported by the support guides 71. The operator pulls the trigger 77 on the pneumatic ram 63 to cause the piston rod 63a to be extended, therefore urging the die plate 70 towards the punch plate 58 to create a shearing-type cutting action therebetween.

When the notch has been formed, the operator releases the trigger 77 to an intermediate position and the piston rod 63a (and die plate 70) are retracted. When the trigger is fully released, the cylinder is isolated from the airline 64 and is exhausted.

As hereinbefore described, the base plate 22 may be pivotally mounted relative to the feet 17 so that the die plate 33 of tool 16, or the punch plate 58 of tool 56, can support the side of the capping as the notch is formed.

In a further modification, the feet 17 may be adjustably secured to the base plate 22 so that the distance between the feet 17 may be adjusted to accommodate ribs 15 of different widths at their base.

The die and punch plates are provided in matching pairs to suit different rib or protrusion profiles, and as hereinbefore described, may be reversible.

While the tools have been described and illustrated forming notches in ridge- or hip-capping, they may be used to form notches in other sheet-metal or sheet plastics or like material components or structure and the die and punch plates may be replaced e.g. by co-operating circular, square, rectangular or other shape die and punches pairs to produce cuts, slots or apertures in such sheet materials.

Various changes and modifications may be made to the embodiment described and illustrated without departing from the scope of the present invention.

We claim:

1. A notching tool for notching sheet-like material comprising:
   a base member, said base member having a pair of support flanges on the underside thereof;
   a notching head on the base member comprising a die member and a punch member adapted to co-operate at a plane with the die member;
   means to operate the notching head; and
   wherein the base member includes a pair of spaced, substantially parallel support members, said support members secured to said support flanges and angularly inclined at an obtuse angle relative to the plane of the punch and die members; and means to interconnect the support members, distance means between the support members being selected to accommodate a rib or protrusion on a first member with the punch and die members sized to form a notch in a sheet-like material wherein said notch co-operates with said rib or protrusion.

2. A notching tool as claimed in claim 1 wherein:
   said die and punch members have a cutting profile corresponding to the profile of said rib or protrusion.

3. A notching tool as claimed in claims 1, or 2 wherein:
   the notching head includes a foot plate and one of the die and punch member pair is fixed on the foot plate, the other member of the pair being pivotally movable relative to the fixed member of the pair to produce a shearing-type cutting action between the pairs of members; and
   the operating means includes means to move the movable member of the pair towards the fixed member of the pair.

4. A notching tool as claimed in claims 1, or 2 wherein:
   the die member and the punch member have complementary cutting plates, the cutting plates being releasably mounted on the die and punch members and reversible, with cutting edges on both faces.

5. A notching tool as claimed in claims 1, or 2 wherein:
   the notching head is pivotally and rotatably mounted on the base member;
   calibration means are provided to indicate the relative position of the notching head to the base member; and
   an outrigger type support member extends outwardly from the base member to prevent tipping of the tool.

6. A notching tool as claimed in claim 1, or 2 wherein:
   adjustable guide means are provided in the notching head to support the sheet-like material while the notch is being formed so that angular alignment between the sheet-like material and the die and punch members is maintained with said guide means also permitting adjustment of the depth of the notch.

* * * * *